United States Patent [19]
Tanaka et al.

[11] Patent Number: 5,339,373
[45] Date of Patent: Aug. 16, 1994

[54] OPTICAL BRANCHING AND COUPLING DEVICE

[75] Inventors: Haruo Tanaka; Naotaro Nakata, both of Kyoto, Japan

[73] Assignee: Rohm Co., Ltd., Kyoto, Japan

[21] Appl. No.: 120,420

[22] Filed: Sep. 14, 1993

[30] Foreign Application Priority Data

Sep. 22, 1992 [JP] Japan ................. 4-253179

[51] Int. Cl.⁵ .................. G02B 6/00; G02B 6/36
[52] U.S. Cl. ........................................... 385/31
[58] Field of Search ............. 385/31, 33, 36, 39, 385/44, 74; 359/114, 124, 583, 588

[56] References Cited

U.S. PATENT DOCUMENTS

| | | | |
|---|---|---|---|
| 4,373,782 | 2/1983 | Thelen | 359/114 |
| 4,423,922 | 1/1984 | Porter | 385/44 |
| 4,564,260 | 1/1986 | Dirmeyer et al. | 385/44 |
| 4,753,508 | 6/1988 | Meuleman | 385/74 |
| 5,050,953 | 9/1991 | Anderson et al. | 385/33 X |
| 5,255,333 | 10/1993 | Althaus et al. | 385/33 |

*Primary Examiner*—Akm E. Ullah
*Attorney, Agent, or Firm*—Nikaido Marmelstein Murray & Oram

[57] ABSTRACT

An optical branching and coupling device is provided in which the loss of light in receiving and in transmission is substantially reduced while at the same time the wavelength-branching characteristic is remarkably improved. The optical branching and coupling device connected to a first optical fiber for inputting a first ray of light and a second ray of light of which respective wavelengths are different from each other and for outputting the first ray and to a second optical fiber for outputting the second ray, and having therein a light-emitting element for emitting the first ray and a light-receiving element for receiving the first ray, the optical branching and coupling device including a first filter for receiving the two rays input from the first optical fiber and a ray of light emitted from the light-emitting element, and a second filter for receiving the rays from the first filter and sending them to the second optical fiber and to the light-receiving element, wherein the first filter is formed, on its front side, with a first filter film adapted to substantially transmit the first ray and to substantially reflect the second ray and, on its back side, with a mirror film adapted to transmit a portion of each of the rays and to reflect the rest thereof; and wherein the second filter is formed, on its front side, with a second filter film adapted to substantially transmit the first ray and to substantially reflect the second ray and, on its back side, with an antireflective film adapted to substantially transmit the first ray.

7 Claims, 2 Drawing Sheets

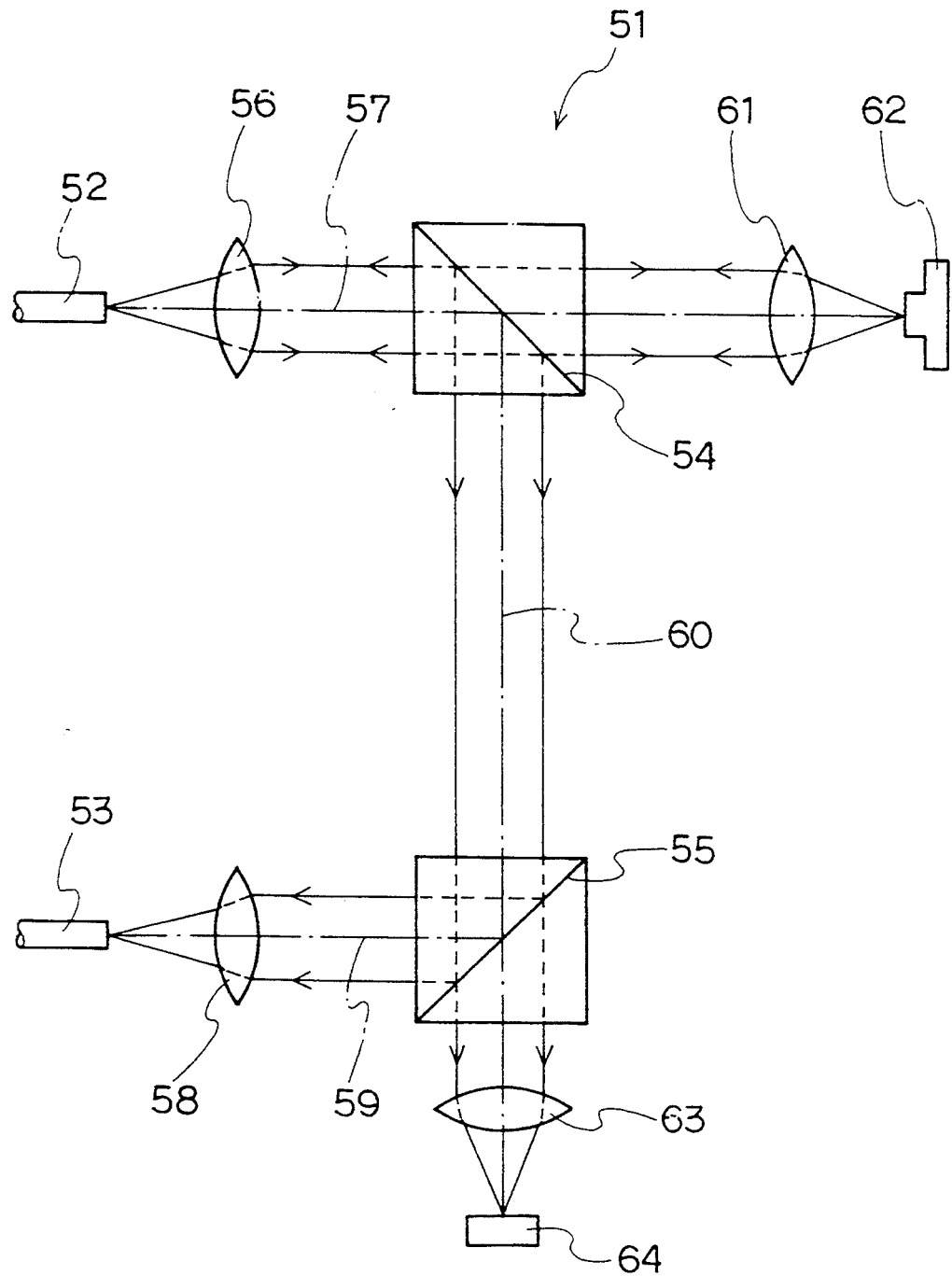

OPTICAL BRANCHING AND COUPLING DEVICE

BACKGROUND OF THE INVENTION

The present invention relates to optical branching and coupling devices. More particularly, it relates to an optical branching and coupling device of the type provided to a terminal of a subscriber's system for branching laser light having two different wavelengths, which is input from an optical fiber, into two rays of light of individual wavelengths so as to receive optical signals of each ray, and coupling light from a light-emitting element such as a laser diode to an optical fiber so as to transmit optical signals thereof.

There has hitherto been known an optical branching and coupling device (hereinafter referred to as "coupler" simply) 51 of the type shown in FIG. 2. To this coupler are connected a first optical fiber 52 for an input of light having two different wavelengths (for example, 1.31 μm and 1.55 μm) and for an output of light of 1.31 μm-wavelength (hereinafter referred to as "1.31 μm-ray"), and a second optical fiber 53 for an output of light of 1.55 μm-wavelength (hereinafter referred to as "1.55 μm-ray") and for providing a connection with a terminal unit such as a television set. Further, in the coupler 51 are provided a half mirror 54 on the side of the first optical fiber 52 and a high pass filter 55 on the side of the second optical fiber 53.

The half mirror 54 is positioned at an angle of 45° with respect to an optical axis (hereinafter referred to as "first optical axis") 57 which runs from the first optical fiber 52 and passes through the center of a first collimating lens 56. The half mirror 54 has a function of permitting about a half of the light quantity of each of the aforementioned rays to pass therethrough and of reflecting the rest.

On the other side, the high pass filter 55 is positioned at an angle of 45° with respect to an optical axis (hereinafter referred to as "third optical axis") 59 which passes through the center of a first converging lens 58 and reaches the second optical fiber. The high pass filter 55 has a function of permitting 1.31 μm-ray to substantially pass therethrough and of substantially reflecting 1.55 μm-ray. The two components 54 and 55 are disposed so that the respective planes thereof would be normal to each other. Therefore, an optical axis (hereinafter referred to as "second optical axis") 60 which runs from the half mirror 54 to the high pass filter 55 crosses each of the optical axes 57 and 59 at right angles.

On the side of the back of the half mirror 54 (on the side opposite to the first optical fiber 52) and substantially on the first optical axis 57 there is provided a light-emitting element 62 for emitting 1.31 μm-ray. In general the light-emitting element 62 is composed of a laser diode. A second collimating lens 61 is interposed between the half mirror 54 and the light-emitting element 62.

On the side of the back of the high pass filter 55 (on the side opposite to the half mirror 54) and substantially on the second optical axis 60 there is provided a light-receiving element 64 composed of a photodiode or the like. A second converging lens 63 is interposed between the high pass filter 55 and the light-receiving element 64.

When 1.31 μm-ray and 1.55 μm-ray are to be input from the first optical fiber 52 to the coupler 51 thus arranged, and when an optical signal is to be transmitted from the light-emitting element 62 to the first optical fiber 52, the following three optical paths appear.

Path (1): receiving 1.31 μm-ray

The 1.31 μm-ray follows the path: first optical fiber 52→half mirror 54 (reflected)→high pass filter 55 (transmitted)→light-receiving element 64. Path (1) allows receiving personal information such as telephone information and telecopier information from a telephone station, digital-to-analog converting it, and receiving the converted signal. 1.55 μm-ray on path (1) is attenuated by 30 dB as will be described later and, hence, the intensity thereof becomes sufficiently small as compared with that of 1.31 μm-ray (refer to Table 1).

Path (2): receiving 1.55 μm-ray 1.55 μm-ray follows the path: first optical fiber 52→half mirror 54 (reflected)→high pass filter 55 (reflected)→second optical fiber 53. Path (2) allows receiving information from mass media such as television programs and is adapted to connect to a terminal unit. A small amount of 1.31 μm-ray is included on path (2) and imposes a burden on a decoder for reproducing signals.

Path (3): transmission of 1.31 μm-ray 1.31 μm-ray follows the path: light-emitting element 62→half mirror 54 (transmitted)→first optical fiber 52. Path (3) allows transmission of personal information such as telephone information and telecopier information.

For the three paths, the loss of each ray and the branching characteristic throughout the coupler 51 in accordance as the advance of each ray are shown in Tables 1 to 3, where T represents a transmittance, and R a reflectance.

TABLE 1

| | Path (1): receiving 1.31 μm-ray | | | |
|---|---|---|---|---|
| Wavelength (μm) | Half mirror | High pass filter | Total | Representation in dB |
| 1.55 | R 0.508 | T 0.002 | 0.001 | −30.0 |
| 1.31 | R 0.483 | T 0.98 | 0.473 | −3.2 |

TABLE 2

| | Path (2): receiving 1.55 μm-ray | | | |
|---|---|---|---|---|
| Wavelength (μm) | Half mirror | High pass filter | Total | Representation in dB |
| 1.55 | R 0.508 | T 0.998 | 0.507 | −3.0 |
| 1.31 | R 0.483 | T 0.02 | 0.009 | −20.2 |

TABLE 3

| | Path (3): transmission of 1.31 μm-ray | |
|---|---|---|
| Wavelength (μm) | Half mirror | Representation in dB |
| 1.31 | T 0.52 | −2.8 |

With the coupler 51, as apparent from Tables 1 to 3, 1.31 μm-ray and 1.55 μm-ray, input from the first optical fiber 52, are each half-reflected by the half mirror 54 and fed to the high pass filter 55, and the remaining half is transmitted through the half mirror 55 and lost. As a result, problems arise such that the power of 1.55 μm-ray to be output is reduced to about a half of the input power thereof, and that 1.31 μm-ray included is removed with a low precision (i.e., poor branching characteristic).

The present invention has been attained so as to overcome the foregoing problems. It is, therefore, an object of the present invention to provide a coupler wherein the loss of a second ray (for example, 1.55 μm-ray) coupled from an input optical fiber (for example, the first optical fiber 52 in the aforementioned prior art) to an output optical fiber (for example, the second optical fiber 53 in the aforementioned prior art) is substantially reduced, while at the same time the wavelength-branching characteristic for branching the second ray and a first ray (for example, 1.31 μm-ray) from each other when to be output to the output optical fiber is remarkably improved.

SUMMARY OF THE INVENTION

According to the present invention, there is provided an optical branching and coupling device connected to a first optical fiber for inputting a first ray of light and a second ray of light of which respective wavelengths are different from each other and for outputting the first ray and to a second optical fiber for outputting the second ray, and having therein a light-emitting element for emitting the first ray and a light-receiving element for receiving the first ray, the optical branching and coupling device comprising a first filter for receiving the two rays input from the first optical fiber and a ray of light emitted from the light-emitting element, and a second filter for receiving the rays from the first filter and sending them to the second optical fiber and to the light-receiving element, wherein the first filter is formed, on its front side, with a first filter film adapted to substantially transmit the first ray and to substantially reflect the second ray and, on its back side, with a mirror film adapted to transmit a portion of each of the rays and to reflect the rest thereof; and wherein the second filter is formed, on its front side, with a second filter film adapted to substantially transmit the first ray and to substantially reflect the second ray and, on its back side, with an antireflective film adapted to substantially transmit the first ray.

Preferably, the first and second optical fibers are connected to the optical branching and coupling device with their optical axes made substantially parallel to each other, and the first and second filters are disposed at an angle of 45° with respect to the optical axes of the first and second optical fibers, respectively.

It is preferably that each of the first and second filter films is a multilayered coat which is formed such that an MgF$_2$ film having a low refractive index and a ZrO$_2$ having a high refractive index are alternately stacked, and wherein said filter film is capable of transmitting almost all the first ray of light, and capable of reflecting almost all the second ray of light.

It is preferable that the filter film is a high-pass filter film formed so as to transmit almost all ray of light having high frequency, and so as to reflect almost all ray of light having low frequency.

It is preferable that mirror film is a multilayered coat which is formed such that an MgF$_2$ film having a low refractive index and a ZrO$_2$ film having a high refractive index are stacked alternately, and wherein said mirror film partially transmits said first ray of light and said second ray of light respectively, and reflects remainder.

It is preferable that the mirror film is a half-mirror film formed so as to transmit about 50% of each of said first ray of light and said second ray of light, and so as to reflect about 50% thereof.

It is preferable that antireflective film is formed such that an MgF$_2$ film having a low refractive index and a ZrO$_2$ film having a high refractive index are alternately stacked, and such that said antireflective film transmits almost all each of said first ray of light and said second ray of light.

In the coupler of the present invention, the first ray of light (for example, light of 1.31 μm-wavelength) input from the first optical fiber is reflected by the mirror film of the first filter, then transmitted through the second filter, and sent to the light-receiving element. On the other hand, the first ray from the light-emitting element is transmitted through the first filter and output to the first optical fiber. Accordingly, the power of the first ray received by the light-receiving element is reduced to about a half of the power thereof at the time of being input from the first optical fiber because the mirror film of the first filter reflects the first ray. The power of first ray output to the first optical fiber is reduced to about a half of the power thereof at the time of being emitted from the light-emitting element because the mirror film transmits the first ray. In this regard, the performance of the prior art device is held as it is in the present invention.

On the other hand, the second ray of light input from the first optical fiber is reflected by the filter films of the first and second filters and, hence, it is output to the second optical fiber with little decrease in power. Furthermore, since the the second ray is reflected twice at the filter films, a very small amount of the first ray included in the second ray passes through the two filter films and is, thereby, separated or removed from the second ray with high precision.

BRIEF EXPLANATION OF THE DRAWINGS

FIG. 2 is a schematic representation illustrating an example of a conventional coupler.

DETAILED DESCRIPTION

Figure 1:
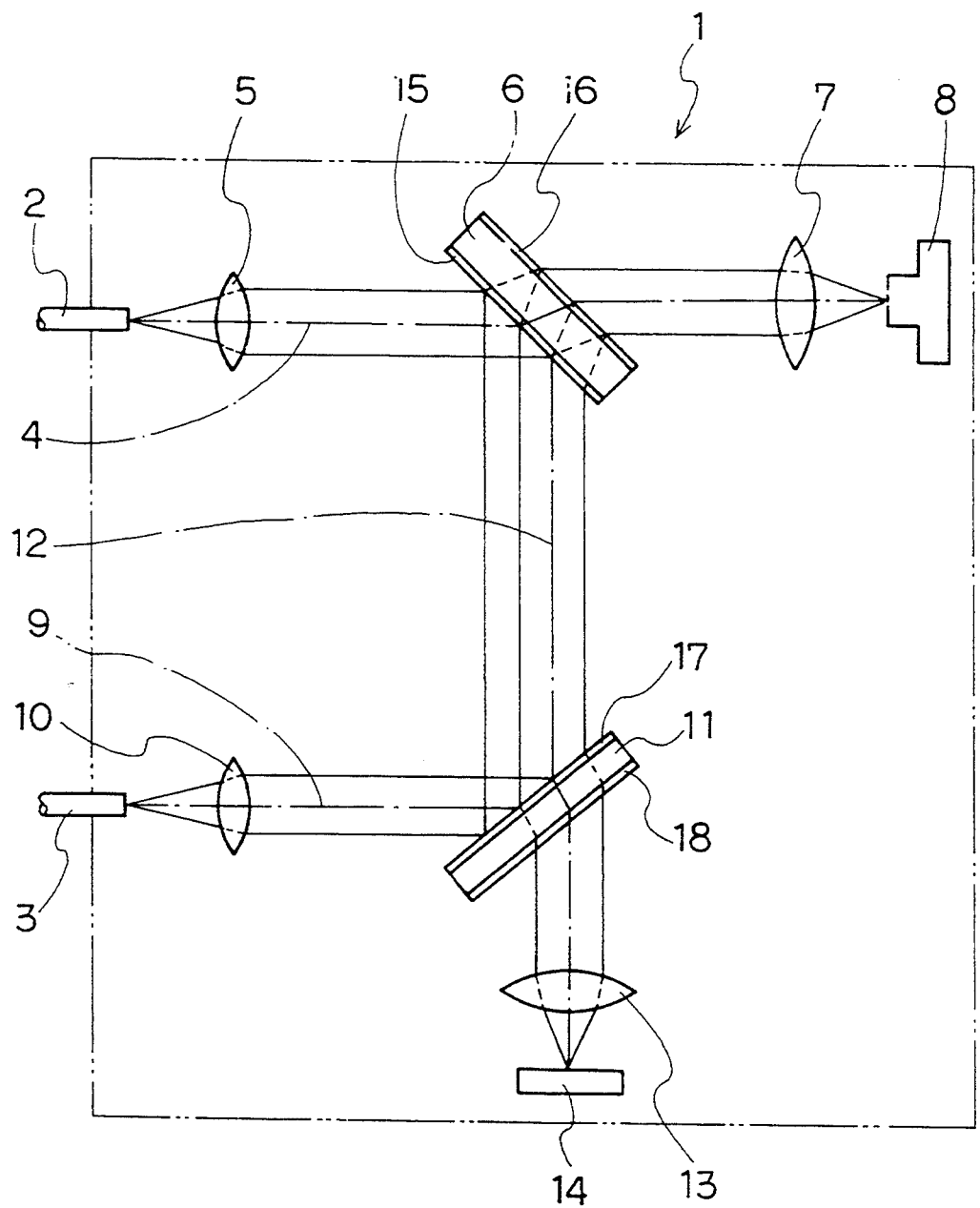
FIG. 1 is a schematic representation illustrating one embodiment of a coupler according to the present invention.

A coupler according to the present invention will now be described in detail with reference to the drawings.

Referring to FIG. 1, numeral 1 denotes a coupler to which first and second optical fibers 2 and 3 are connected. The first optical fiber 2 serves to input (receive) a first ray of light of 1.31 μm-wavelength (hereinafter referred to as "1.31 μm-ray") and a second ray of light of 1.55 μm-wavelength (hereinafter referred to as "1.55 μm-ray") and to output (transmit) the 1.31 μm-ray. On the other hand, the second optical fiber 3 serves to output the received 1.55 μm-ray to a terminal unit or a like device.

Inside the coupler 1 and substantially on an optical axis 4 of the first optical fiber 2 (hereinafter referred to as "first optical axis") are disposed a first collimating lens 5, first filter 6, second collimating lens 7 and light-emitting element 8 such as formed of a laser diode in this order with a slightly spaced relation. On an optical axis 9 of the second optical fiber 3 (hereinafter referred to as "third optical axis") are disposed a first converging lens 10 and second filter 11 in this order with a slightly spaced relation. A face of the first filter 6 is inclined to the first optical axis 4 at 45°, and a face of the second filter 11 is also inclined to the third optical axis 9 at 45°. Both faces form an angle of 90° with respect to each other. An optical axis 12 from the first filter 6 to the second filter 11 (hereinafter referred to as "second optical axis") forms an angle of 90° with respect to each of the first and third optical axes 4 and 9. On the second optical axis 12 and on the back side of the second filter 11 (on the side opposite to the location of the first filter 6) are disposed a second converging lens 13 and light-receiving element 14 in this order with a slightly spaced relation.

It should be appreciated that the positional relation between these components in the above description is merely an example and is not limitative of the present invention. Further, although the lenses 5, 7, 10 and 13 herein are each termed collimating lens or converging lens depending on the light-advancing direction, they are all convex lenses having both functions.

The first and second filters 6 and 11 are each a flat plate member of which both faces are parallel to each other, and each have a substrate formed from borosilicate glass. On the front face of the first filter 6 (on the side the first optical fiber 2 lies) is formed a first high pass filter film 15, and on the back face thereof (on the side the light-emitting element 8 lies) is formed a half mirror film 16. On the front face of the second filter 11 (on the side the second optical fiber 3 lies) is formed a second high pass filter film 17, and on the back face thereof (on the side the light-receiving element 14 lies) is formed an antireflective coat film 18 which transmits light almost completely.

The first and second high pass filter films 15 and 17 are each a multilayered coat in which an $MgF_2$ film having a low refractive index and a $ZrO_2$ film having a high refractive index are alternately stacked to have 15 layers by vacuum vapor deposition. These high pass filter films 15 and 17 have a property of transmitting 98% of 1.31 $\mu$m-ray and reflecting 99.8% of 1.55 $\mu$m-ray. The half mirror film 16 is also a multilayered coat in which an $MgF_2$ film and a $ZrO_2$ film are alternately stacked to have eight layers and has a property of transmitting about 50% of each of the two rays and reflecting about 50% thereof. Similarly, the nonreflective film 18 is a multilayered coat in which an $MgF_2$ film and a $ZrO_2$ film are alternately stacked to have five layers and has a property of transmitting 99.9% of each of the two rays and reflecting 0.1% thereof.

The light-emitting element 8 and the light-receiving element 14 are composed of a laser diode and a photodiode, respectively, which are both well known.

When the coupler 1 of such an arrangement receives 1.31 $\mu$m-ray and 1.55 $\mu$m-ray from the first optical fiber 2 and transmits 1.31 $\mu$m-ray from the light-emitting element 8 to the first optical fiber 2, the following three optical paths appear.

Path (1): receiving 1.31 $\mu$m-ray 1.31 $\mu$m-ray follows the path: first optical fiber 2→first high pass filter film 15 (transmitted)→half mirror film 16 (reflected)→first high pass filter film 15 (transmitted)→second high pass filter film 17 (transmitted)→light-receiving element 14. As in the conventional coupler, through this path (1) is received personal information such as of telephone, telecopier, visual telephone or personal computer communication. There is little inclusion of 1.55 $\mu$m-ray in path (1).

Path (2): receiving 1.55 $\mu$m-ray 1.55 $\mu$m-ray follows the path: first optical fiber 2→first high pass filter film 15 (reflected)→second high pass filter film 17 (reflected)→second optical fiber 3. As in the conventional coupler, through path (2) is received information from mass media such as television programs. Although there is a very little inclusion of 1.31 $\mu$m-ray in this path, no problem will arise in practical use.

Path (3): transmission of 1.31 $\mu$m-ray 1.31 $\mu$m-ray follows the path: light-emitting element 8→half mirror film 16 (transmitted)→first high pass filter film 15 (transmitted)→first optical fiber 2. As in the conventional coupler, through this path (3) is transmitted personal information such as of telephone, telecopier, visual telephone or personal computer communication.

For the three paths, the loss of each ray and the branching characteristic throughout the coupler 1 in accordance as the advance of each ray are shown in Table 4 to 6, where T represents a transmittance, and R a reflectance.

TABLE 4

| Wavelength ($\mu$m) | Path (1): receiving 1.31 $\mu$m-ray | | | | | |
|---|---|---|---|---|---|---|
| | First high pass | Half mirror | First high pass | Second high pass | Total | Representation in dB |
| 1.55 | T 0.002 | R 0.508 | T 0.002 | T 0.002 | 0.000 | −83.9 |
| 1.31 | T 0.98 | R 0.493 | T 0.98 | T 0.98 | 0.454 | −3.4 |

TABLE 5

| Wavelength ($\mu$m) | Path (2): receiving 1.55 $\mu$m-ray | | | |
|---|---|---|---|---|
| | First high pass | Second high pass | Total | Representation in dB |
| 1.55 | R 0.998 | T 0.998 | 0.996 | −0.02 |
| 1.31 | R 0.02 | T 0.02 | 0.0004 | −33.9 |

TABLE 6

| Wavelength ($\mu$m) | Path (2): transmission of 1.31 $\mu$m-ray | | | |
|---|---|---|---|---|
| | Half mirror | First high pass | Total | Representation in dB |
| 1.31 | T 0.52 | T 0.98 | 0.51 | −2.9 |

When the above characteristics of the present invention are compared with those of the conventional coupler (refer to Tables 1 to 3), the loss of 1.31 $\mu$m-ray in receiving is −3.4 dB in the present invention while −3.2 dB in the conventional coupler, and the loss thereof in transmitting is −2.9 dB in the present invention while −2.8 dB in the conventional coupler. Thus, the present invention possesses essentially the same characteristics for 1.31 $\mu$m-ray. On the other hand, the loss of 1.55 $\mu$m-ray in coupling is −0.02 dB in the present invention while, in contrast, −3.0 dB in the conventional coupler. Thus, there is little loss and a wonderful improvement is made. Furthermore, there is little inclusion of 1.31 $\mu$m-ray, i.e., −33.9 dB and, hence, 1.31 $\mu$m-ray included in 1.55 $\mu$m-ray is nearly removed. If the value −33.9 dB according to the present invention is compared with the value −20.2 dB according to the conventional coupler, the branching characteristic is found to be remarkably improved by the present invention.

Although 1.31 $\mu$m-ray and 1.55 $\mu$m-ray are used in the above embodiment, there is no limitation to these wavelengths in the present invention. The wavelength of light can be appropriately selected depending on the distance of transmisssion; for example, light of an AlGaAs laser (wavelength: 720 to 850 nm) or of an InGaAlP laser (wavelength: 630 to 680 nm) can be used. In addition, the high pass filter or a like component can be modified in accordance as the wavelength.

As has been described, with the coupler of the present invention the optical coupling of the second ray of light from the first optical fiber to the second optical fiber is accomplished with a very little loss, while the first and second rays are separated from each other with remarkably improved wavelength-branching characteristics.

For this reason, the coupler of the present invention can transmit and receive personal information with a good precision while receiving information of mass media also with a good precision, using one optical fiber. In addition, the coupler of the present invention can be installed for home use with ease by virtue of its simple construction, thus greatly contributing to the development of optical communications.

Though several embodiments of the present invention are described above, it is to be understood that the present invention is not limited only to the above-mentioned, various changes and modifications may be made in the invention without departing from the spirit and scope thereof.

What is claimed is:

1. An optical branching and coupling device connected to a first optical fiber for inputting a first ray of light and a second ray of light of which respective wavelengths are different from each other and for outputting the first ray and to a second optical fiber for outputting the second ray, and having therein a light-emitting element for emitting the first ray and a light-receiving element for receiving the first ray, the optical branching and coupling device comprising a first filter for receiving the two rays input from the first optical fiber and a ray of light emitted from the light-emitting element, and a second filter for receiving the rays from the first filter and sending them to the second optical fiber and to the light-receiving element, wherein the first filter is formed, on its front side, with a first filter film adapted to substantially transmit the first ray and to substantially reflect the second ray and, on its back side, with a mirror film adapted to transmit a portion of each of the rays and to reflect the rest thereof; and wherein the second filter is formed, on its front side, with a second filter film adapted to substantially transmit the first ray and to substantially reflect the second ray and, on its back side, with an antireflective film adapted to substantially transmit the first ray.

2. The optical branching and coupling device of claim 1, wherein said first and second optical fibers are connected to the optical branching and coupling device with their optical axes made substantially parallel to each other, and said first and second filters are disposed at an angle of 45° with respect to the optical axes of said first and second optical fibers, respectively.

3. The optical branching and coupling device of claim 1, wherein each of said first and second filter films is a multilayered coat which is formed such that an $MgF_2$ film having a low refractive index and a $ZrO_2$ having a high refractive index are alternately stacked, and wherein said filter film is capable of transmitting almost all said first ray of light, and capable of reflecting almost all said second ray of light.

4. The optical branching and coupling device of claim 1 or 3, wherein said filter film is a high-pass filter film formed so as to transmit almost all ray of light having high frequency, and so as to reflect almost all ray of light having low frequency.

5. The optical branching and coupling device of claim 1, wherein said mirror film is a multilayered coat which is formed such that an $MgF_2$ film having a low refractive index and a $ZrO_2$ film having a high refractive index are stacked alternately, and wherein said mirror film partially transmits said first ray of light and said second ray of light respectively, and reflects remainder.

6. The optical branching and coupling device of claim 1 or 5, wherein said mirror film is a half-mirror film formed so as to transmit about 50% of each of said first ray of light and said second ray of light, and so as to reflect about 50% thereof.

7. The optical branching and coupling device of claim 1, wherein said antireflective film is formed such that an $MgF_2$ film having a low refractive index and a $ZrO_2$ film having a high refractive index are alternately stacked, and such that said antireflective film transmits almost all each of said first ray of light and said second ray of light.

* * * * *